United States Patent
Symonds et al.

(10) Patent No.: US 7,201,315 B2
(45) Date of Patent: Apr. 10, 2007

(54) SERVICE STATION CAR WASH

(75) Inventors: Michael J. Symonds, Kernersville, NC (US); Francis C. Williams, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 204 days.

(21) Appl. No.: 10/430,689

(22) Filed: May 6, 2003

(65) Prior Publication Data

US 2004/0079799 A1   Apr. 29, 2004

Related U.S. Application Data

(60) Provisional application No. 60/380,111, filed on May 6, 2002.

(51) Int. Cl.
*G06K 15/00* (2006.01)
(52) U.S. Cl. .................. 235/383; 235/380; 235/381
(58) Field of Classification Search ............. 235/383, 235/381, 380; 705/1, 13, 64
See application file for complete search history.

(56) References Cited

U.S. PATENT DOCUMENTS

| | | | |
|---|---|---|---|
| 5,831,861 A * | 11/1998 | Warn et al. ............. 700/231 |
| 6,073,840 A * | 6/2000 | Marion ................. 235/381 |
| 6,402,030 B1 * | 6/2002 | Summers et al. ......... 235/381 |
| 6,527,176 B2 * | 3/2003 | Baric .................. 235/381 |
| 6,574,603 B1 * | 6/2003 | Dickson et al. ........... 705/1 |
| 6,722,473 B1 * | 4/2004 | Ramachandran et al. .... 186/36 |
| 6,789,733 B2 * | 9/2004 | Terranova et al. ....... 235/381 |
| 2002/0116286 A1 * | 8/2002 | Walker et al. ........... 705/26 |

* cited by examiner

*Primary Examiner*—Ahshik Kim
(74) *Attorney, Agent, or Firm*—Withrow & Terranova, PLLC

(57) ABSTRACT

An improved service station car wash system. A car wash kiosk is coupled to the fuel dispenser communication loop in the forecourt of the service station so that the car wash kiosk appears to the service station controller just as a fuel dispenser would. The car wash kiosk sends a car wash request over the fuel dispenser communication loop to the service station site controller. The service station controller handles any payment processing needed, as it would for payment entered at a fuel dispenser, and in turn communicates such request to a car wash controller for initiation of a car wash. The service station site controller is able to communicate to the car wash kiosk in a similar manner as communication occurs with a fuel dispenser, thereby making the functionality present in the service station controller for fuel dispenser applicable and reusable for a car wash kiosk.

74 Claims, 8 Drawing Sheets

SERVICE STATION CAR WASH

RELATED APPLICATION

This patent application claims priority to U.S. Provisional Patent Ser. No. 60/380,111, filed on May 6, 2002, which is incorporated herein by reference in is entirety.

FIELD OF THE INVENTION

The present invention relates to an improved car wash device, system, and method in a service station environment.

BACKGROUND OF THE INVENTION

Today, car wash facilities are often included at service stations. Customers can obtain a car wash for their vehicle when visiting a service station. A typical service station is comprised of a plurality of fuel dispensers connected to a service station site controller, which may also be a point-of-sale (POS) device. The POS controls the high-level authorization and functionality of each of the fuel dispensers. Each of the fuel dispensers is connected to the POS through a pump communication loop, where each individual fuel dispenser is individually addressable as a client on the pump loop.

Car wash systems at service stations that exist today provide a separate car wash controller that controls the physical car wash. A car wash controller is directly connected to the POS via direct communication link. The car wash controller is not connected to the pump communication loop and does not appear to the POS as a client like that of a fuel dispenser. A car wash controller has two physical links in addition to its RS-232 link to the POS. The first link is to a coin box. The second link is to the physical car wash itself. In this manner, the car wash controller controls activation of the car wash based on the customer's interaction with the coin box.

There are two methods of obtaining a car wash. A customer can enter payment at the coin box, and the coin box interacts with the car wash controller to authorize the physical car wash. Or the customer can pay for a car wash at the POS or the fuel dispenser. The POS, either initially or through communication with a fuel dispenser, communicates a car wash request to the car wash controller, via the direct link between the POS and the car wash controller, to request an authentication code. The authentication code is given to the customer and is later entered at the coin box when the customer desires to receive the car wash. The coin box communicates the authentication code to the car wash controller, and the car wash controller activates the physical car wash if the authentication code is authenticated as having been previously generated by the car wash controller in response to a request from the POS.

Because the coin box is directly connected to the car wash controller, the POS cannot communicate to the coin box. Any payment at the coin box for a car wash must be handled solely by the coin box thereby requiring the coin box to provide all functionality for all payment processing types. Coin boxes typically only accept authorization codes (received at the fuel dispenser or POS) or cash for payment of a car wash. Given that many customers do not carry cash on hand, a customer who desires to purchase a car wash at the coin box is not able to do so. This sometimes results in lost sales and causes non-paying customers to take up space in the line for entrance into the car wash. Therefore, a need exists to provide a coin box with alternative payment possibilities to allow a customer to more easily pay for a car wash.

SUMMARY OF THE INVENTION

The present invention relates to a car wash kiosk that is adapted to communicate a car wash request to a service station site controller. The service station contains a service station site controller, which may be a point-of-sale device (POS), coupled to a plurality of fuel dispensers via a fuel dispenser communication loop. In this manner, the car wash kiosk is capable of communicating with the POS to provide the same payment processing functionality as exists at fuel dispensers that are coupled to the POS. The fuel dispenser communication loop is configured so that the service station site controller can individually address each one of the fuel dispensers. A car wash kiosk is also coupled to the fuel dispenser communication loop so that the service station site controller is capable of individually addressing the car wash kiosk as well.

The car wash kiosk comprises an input device adapted to receive a car wash request from a customer. The input device may accept forms of payment or a code so that the customer can pay for the car wash. The input device is coupled to a control system that is adapted to receive configuration information from the service station site controller and communicate the customer car wash request over the fuel dispenser communication loop to the service station site controller to request authorization for a car wash.

The service station site controller receives payment information at the car wash kiosk entered in by the customer. If the payment information is a customer account, the service station site controller authenticates and authorizes the customer's account. Such may be done either before the car wash request is communicated to a car wash controller or after the car wash request is communicated to a car wash controller. The car wash controller either initiates a physical car wash when the car wash request is received, or returns an authentication code to the customer for later entry at the car wash kiosk if the customer wants to pay for a car wash, but receive the car wash at a later time. The customer may also request a car wash directly at the service station site controller or a fuel dispenser.

When the customer desires to receive a car wash previously paid for at the car wash kiosk, fuel dispenser, or service station site controller, the customer enters the authentication code in the car wash kiosk. The car wash kiosk communicates the code to the car wash controller, via the service station site controller, for authentication. If the code is authenticated by the car wash controller, the car wash controller will initiate the physical car wash.

The car wash kiosk also allows a customer to upgrade a car wash if the car wash initially selected is not the most expensive. The car wash kiosk prompts the customer for additional payment if there is a payment balance due between the amount for the initially selected car wash and the more expensive car wash.

The car wash kiosk is also designed to perform all of the aforementioned functionalities even if another customer's vehicle is already in the physical car wash receiving a car wash in, order to reduce waiting time and increase throughput.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

This patent application claims priority to U.S. Provisional Patent Ser. No. 60/380,111, filed on May 6, 2002, which is incorporated herein by reference in is entirety.

Figure 1:
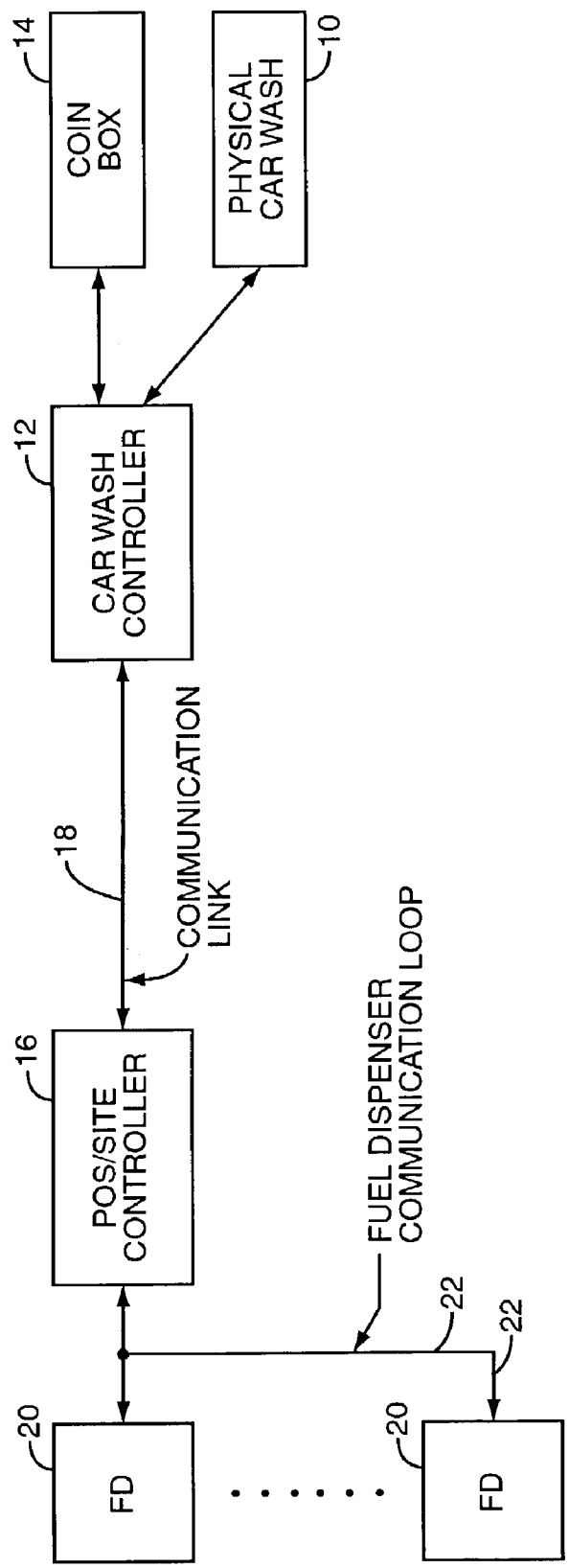
FIG. 1 is a schematic diagram of a prior art car wash system in a service station environment.

Before discussing the particular aspects of the present invention, a description of a car wash system in a service station environment known today before the present invention is described below and illustrated in FIG. 1. A physical car wash 10 is provided that comprises all of the mechanical elements, such as brushes or cloths, water, etc., to perform a car wash on a customer's vehicle. One such example of a physical car wash 10 can be found in U.S. Pat. No. 5,730,061 entitled "Automatic conveyor system with damage-free guide rails," incorporated herein by reference in its entirety. Other examples may be found at the website http://www.ryko.com/welcome_files/UltraSonic%202001.pdf, which is incorporated herein by reference in its entirety. A physical car wash 10 is communicatively coupled to a car wash controller 12. The car wash controller 12 is a micro-controller, microprocessor, or other form of electronics that provides controlling functions over the physical car wash 10. The communication link between the car wash controller 12 and the physical car wash 10 is through an electrical connection. The car wash controller 12 also electrically couples to and interfaces with a coin box 14. The coin box 14 is accessible for a customer to insert payment for a car wash. The coin box 14 typically includes a keypad (not shown), a currency acceptor (not shown), and a coin acceptor (not shown).

If a customer desires a car wash in this system, one method is for the customer to insert payment at the coin box 14. The coin box 14 will typically have various prices for different types of car washes that can be performed by the physical car wash 10 as controlled by the car wash controller 12. The coin box 14 is typically located proximate or nearby the physical car wash 10, and is often accessible by a customer when inside his vehicle. The customer approaches the coin box 14 from either inside or outside his vehicle. The customer then inserts the proper amount of money into the coin box 14, in the form of currency or coin, to pay for the particular car wash desired. Once the coin box 14 determines that the proper amount of money has been inserted by the customer, the coin box 14 then communicates this condition to the car wash controller 12. The car wash controller 12 then communicates with the physical car wash 10 to activate the car wash.

Most typical physical car washes 10 have a red light and a green light (not shown) that are visible to a customer about to drive into the physical car wash 10. If the physical car wash 10 is inactive, the car wash controller 12 causes the physical car wash 10 to display the red light indicating that the customer should not enter the physical car wash 10. The physical car wash 10 may also display the green light indicating that the customer should drive into the physical car wash 10. This light is controlled green by the car wash controller 12 once proper payment has been inserted into the coin box 14 to indicate that a car wash should be delivered to a customer.

The car wash controller 12 controls all of the different types of functions of the physical car wash 10, and the physical car wash 10 may perform different types of services (e.g. wash, rinse, wax, undercoating, etc.) on the vehicle depending on the type of car wash selected by the customer. The physical car wash 10 may also have indicators that determine when the customer's vehicle has driven far enough into the physical car wash 10. These sensors or indicators are communicatively coupled to the car wash controller 12. The car wash controller 12 can then send the physical car wash 10 an appropriate command to display an indicator to the customer to stop his vehicle, such as illuminating a red light when the vehicle is in the proper position to receive the car wash. After the car wash is completed, the car wash controller 12 may indicate a green light condition again to the customer in the physical car wash 10 to indicate that the car wash is done and the customer can drive off.

In a service station environment, the car wash system described above can also be activated through the fuel dispensers 20 or at a service station site controller 16, typically located inside a convenience store on the service station site. The service station site controller 16 may simply be a controller that controls the activation of the fuel dispensers 20, such as the Gilbarco TS-1000® controller. Or the service station site controller 16 may also include expanded functionality to include point-of-sale, accounting and inventory management handling, such as the Gilbarco G-SITE®. The term "service station site controller" 16 and "POS" 16 are used herein interchangeably. A service station site controller may not include point-of-sale functionalities, but is referenced as POS 16 herein in this patent application for convenience sake, and the definition of "POS" is deemed to include a service station site controller 16 or a POS 16 having expanded functionality, or any device having similar functionality to control the fuel dispensers 20. More information on the POS 16 coupled to a plurality of fuel dispensers 20 and such interaction can be found in U.S. Pat. No. 6,073,840, entitled "Fuel dispensing and retail system providing for transponder prepayment," incorporated herein by reference in its entirety. A distribution box (not shown) or other interfacing hardware may also be included between the fuel dispensers 20 and the POS 16.

The POS 16 may act as a point-of-sale device for sales inside the convenience store. The POS 16 also controls each of the fuel dispensers 20 in the service station forecourt area. Each of the fuel dispensers 20 is communicatively coupled to the POS via a fuel dispenser communication loop 22. The fuel dispenser communication loop 22 is a wired bus or link that enables the POS 16 to individually address each of the fuel dispensers 20, and vice versa, for control and various communication functions.

The POS 16 is also communicatively coupled to the car wash controller 12 via a dedicated communications link 18. The dedicated communications link 18 is not the same link as the fuel dispenser communication loop 22. The dedicated communications link 18 is a dedicated communication line between the POS 16 and the car wash controller 12. The customer can purchase a car wash for his or her vehicle at one of the fuel dispensers 20 or at the POS 16. The fuel dispensers 20 and the POS 16 are configured to offer various types of car washes to a customer, either when inside the convenience store or during a fueling purchase at a fuel dispenser 20. The POS 16 has knowledge of the different types of car washes available as well as their price via the dedicated communications link 18 to the car wash controller 12.

If a customer desires to purchase a car wash when inside the convenience store, the customer will tender proper payment to an operator at the POS 16. The operator will enter the payment into the POS 16 for the type of car wash desired. A communication message will be sent over the dedicated communication link 18 to the car wash controller 12 in the form of a car wash request. The car wash request will indicate to the car wash controller 12 that a car wash has been paid for and is desired. The car wash controller 12 will generate an authentication code that can later be entered into a keypad on the coin box 14 to receive the car wash. The authentication code is returned by the car wash controller 12 over the dedicated communications link 18 to the POS 16. The authentication code is given to the customer for later use. The most typical form of giving the authentication code to the customer is by the POS 16 printing out a paper receipt containing the authentication code. Typically, the authentication code is only valid for a certain amount of time. Also, note that the POS 16 may be configured to not allow the car wash kiosk 24 to accept authentication codes thereby only allowing the customer to pay for a car wash at the car wash kiosk 24 using an automated self-serve payment, discussed below.

Once a customer has the authentication code from the POS 16, the customer can later enter the authentication code on a keypad or other device on the coin box 14. Once the authentication code is entered into the coin box 14, the coin box 14 communicates the authentication code to the car wash controller 12. The car wash controller 12 has stored in its memory (not shown) a list of authentication codes that have been generated. If the authentication code communicated by the coin box 14 to the car wash controller 12 is authenticated by the car wash controller 12 (i.e., contained in its list of previously issued authentication codes), the car wash controller 12 will send an authorization message to the physical car wash 10 to activate the physical car wash 10, just as previously discussed.

If a customer desires to purchase a car wash at a fuel dispenser 20, the operation is similar to the purchase of the car wash at the POS 16, just as described above. The customer tenders payment for the car wash at the fuel dispenser 20, and the fuel dispenser 20 sends a communication message to the POS 16 over the fuel dispenser communication loop 22. The POS 16 then sends a car wash request to the car wash controller 12 over the dedicated communication link 18, just as previously described above. The car wash controller 12 then returns an authentication code to the POS 16, in which case the POS 16 will return the authentication code to the fuel dispenser 20. Again, the authentication code is given to the customer typically in the form of a number printed on a receipt at the fuel dispenser 20. The authentication code may also be visually displayed on a display on the fuel dispenser 20. The customer can use the authentication code at the coin box 14 to authorize the car wash, just as previously described above.

Figure 2:
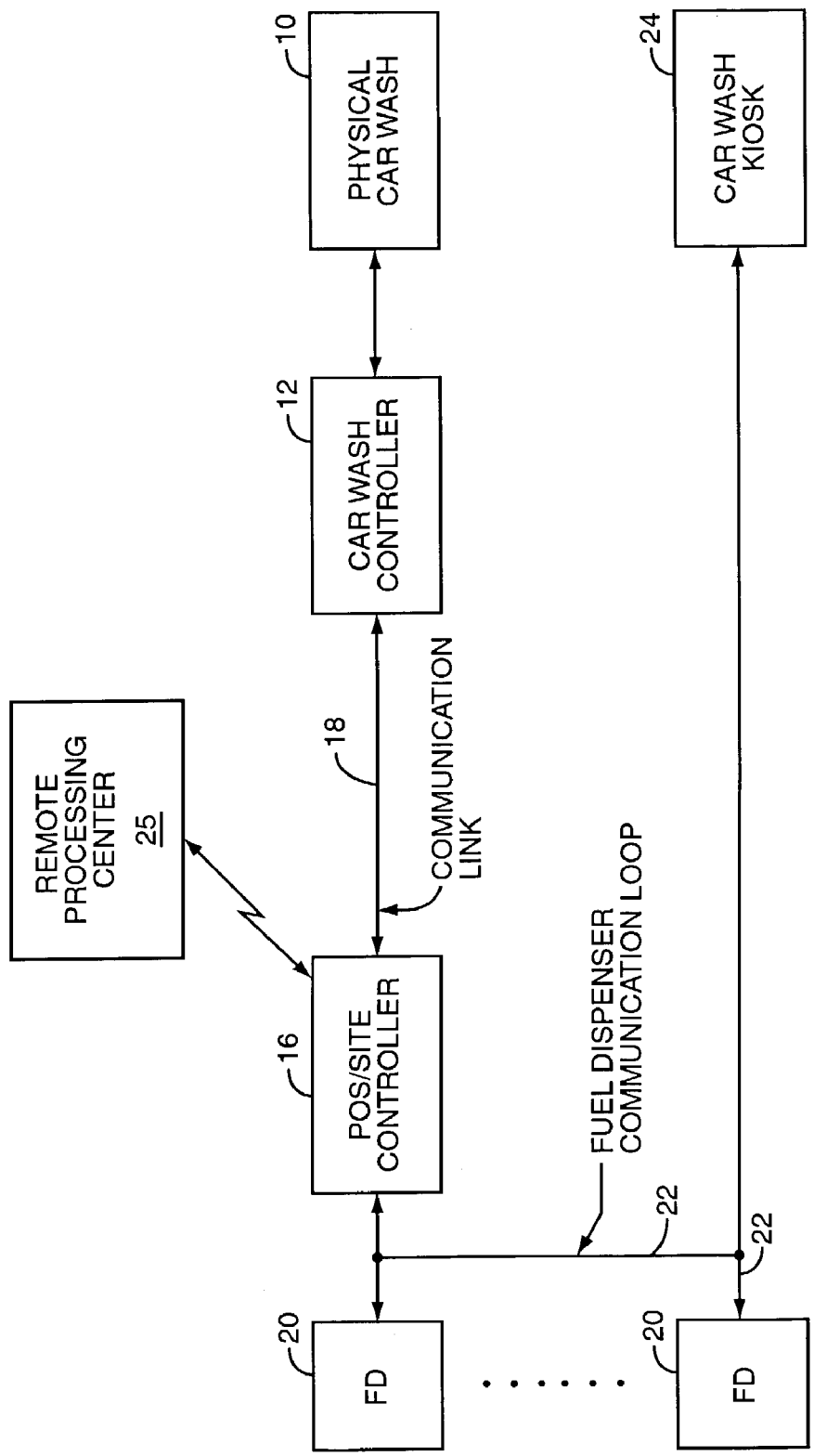
FIG. 2 is a schematic diagram of a car wash system in a service station environment according to the present invention.

FIG. 2 illustrates a car wash system in a service station environment according to the present invention. In the present invention, a car wash kiosk 24 is communicatively coupled to the POS 16 via the fuel dispenser communication loop 22, just as are each of the fuel dispensers 20. In this embodiment, only one car wash kiosk 24 is coupled to the fuel dispenser communication loop 22, multiple car wash kiosks 24 may be coupled to the fuel dispenser communication loop 24 to provide multiple interfaces for access to one or more physical car washes 10. Further, more than one physical car wash 10 may be coupled to the car wash controller 12 so that one or more of the car wash kiosks 24 can cause any of the physical car washes 10 to be activated.

The car wash kiosk 24 is typically located proximate the physical car wash 10. The communication and authorization scheme for a customer purchasing a car wash at the fuel dispenser 20 or the POS 16 is the same as described above. However, in the present invention, a customer purchasing a car wash at the car wash kiosk 24 operates quite differently than previously described.

A customer desiring to purchase a car wash nearby the physical car wash 10 approaches the car wash kiosk 24. The car wash kiosk 24 displays the different types of car washes available to the customer. The customer then chooses the desired car wash and inserts payment into the car wash kiosk 24 for the physical car wash 10. The different functional aspects of the car wash kiosk 24, including different types of payment, are discussed below in FIG. 3. The car wash kiosk 24, after receiving proper payment from the customer, sends a car wash request message over the fuel dispenser communication loop 22 to the POS 16. The POS 16 then sends a car wash request over the communication link 18 to the car wash controller 12. Note that any type of communication link between the POS 16 and the car wash controller 12 may be used, including wired or wireless communication links.

The car wash controller 12 knows through the communication by the POS 16 that the car wash request is coming from a car wash kiosk 24 rather than from the POS 16 itself or one of the fuel dispensers 20. This is important, because the car wash controller 12 may not generate an authentication code or return the code back to the POS 16 to then communicate over the fuel dispenser communication loop 22 to the car wash kiosk 24. Instead, the car wash controller 12 knows that the customer is already proximate and in line at the physical car wash 10, since the car wash request was generated from the car wash kiosk 24. The car wash controller 12 may simply authorize and initiate the physical car wash 10 so that the customer can drive into the physical car wash 10 to receive the car wash. Or the car wash kiosk 24 can be configured such that the customer still receives an authentication code to come back to the car wash at a later time to receive the car wash.

The advantages of the car wash kiosk 24 being communicatively coupled to the fuel dispenser communication loop 22 are many. First, the POS 16 is configured to display various types of information messages, merchandising, and advertising on the fuel dispensers 20. The POS 16 sends such communications messages and advertising to the fuel dispensers 20 over the fuel dispenser communication loop 22. Since each of the fuel dispensers 20 is individually addressable by the POS 16, the POS 16 can deliver targeted or specific messages to each of the fuel dispensers 20. For example, see U.S. Pat. No. 6,052,629, entitled "Internet capable browser dispenser architecture," incorporated herein by reference in its entirety.

Because the car wash kiosk 24 is also coupled to the fuel dispenser communication loop 22, the POS 16 recognizes the car wash kiosk 24 as just another addressable device on the fuel dispenser communication loop 22. Therefore, the POS 16 can display the same types of messages, merchandising, and advertising on the car wash kiosk 24 as can be done on the fuel dispensers 20. The amount of changes in the POS 16 software to support communications from the car wash kiosk 24 is greatly minimized, since most of the software regarding such communications has already been developed for communication between the POS 16 and the fuel dispenser 20. In essence, all of the software work done for the POS 16 to interact with and control the fuel dispensers 20 can also be used to a great extent to interact and control the car wash kiosk 24.

The POS 16 is also configured to communicate with the fuel dispenser 20 for customer help. If a customer is requiring help with a fuel dispenser 20, the customer can often press a help button on the fuel dispenser 20. This causes a message to be sent to the POS 16 and for a communication channel to be established between the POS 16 and the fuel dispenser 20. In this manner, the operator can talk to the customer at the fuel dispenser 20 to aid him during the transaction. Since the car wash kiosk 24 is also on the fuel dispenser communication loop 22, this functionality in the POS 16 is easily provided for at the car wash kiosk 24 as well.

The POS 16 is also configured to receive credit card payment information for payment of a fueling transaction. A customer enters his credit or debit card at the fuel dispenser 20 for payment of fuel. The fuel dispenser 20 communicates the credit or debit card payment information contained on the card, typically in the form of track 1 or track 2 data, over the fuel dispenser communication loop to the POS 16 controller. The POS 16 communicates this card information to a remote processing center 25. Such communication may be through land-lines, a public service telephone network (PSTN), private network, or public network, such as the Internet. The remote processing center 25 determines if the credit card information is valid and returns an authorization message to the POS 16 if the credit card can be used for payment of fuel. The POS 16 sends an authorization message to the particular fuel dispenser 20 that initiated the credit card transaction for payment of fuel. In this manner, the POS 16 can receive payment for fuel at a fuel dispenser 20 via a credit card transaction.

Because the car wash kiosk 24 is also coupled to the fuel dispenser communication loop 22, the same software that enables the POS 16 to handle credit card transactions can also be used for credit card payments by the customer at the car wash kiosk 24. Credit and debit cards were not used for payment of car washes at the car wash kiosk 24 in the past. One main reason for this is that the car wash kiosk 24, in the form of a coin box 14, was coupled to the car wash controller 12 instead of the fuel dispenser communication loop 22. In order for the car wash controller 12 to provide credit or debit card handling, additional redundant functionality and cost would have to be added to the car wash controller 12 that is similar to the additional functionality of the POS 16 to communicate remotely to a remote processing center 25. Such would require duplication of effort already present in the POS 16. By coupling the car wash kiosk 24 to the fuel dispenser communication loop 22, this credit card handling and communication to the remote processing center 25 does not have to be duplicated since the car wash kiosk 24 is communicating over the fuel dispenser communication loop 22 to the POS 16. The car wash controller 12 of the present invention, by being coupled to the fuel dispenser communication loop 22, is also able to handle payment by RFID or other types of payment that the POS 16 is adapted to handle.

Communication between the car wash kiosk 24 and the POS 16 also allows other functionalities that are not possible in the prior art. The car wash kiosk 24 can report all sales made at the car wash kiosk 24 to the POS 16 for purposes of compiling sales reports instead of the POS 16 receiving more general sales information from the car wash controller 12. The prices for each item offered at the car wash kiosk 24, the number of refunds issued, and upgrades to car washes performed, for example, are communicated to the POS 16 in more detail to include in any related reports generated by the POS 16.

Figure 3:
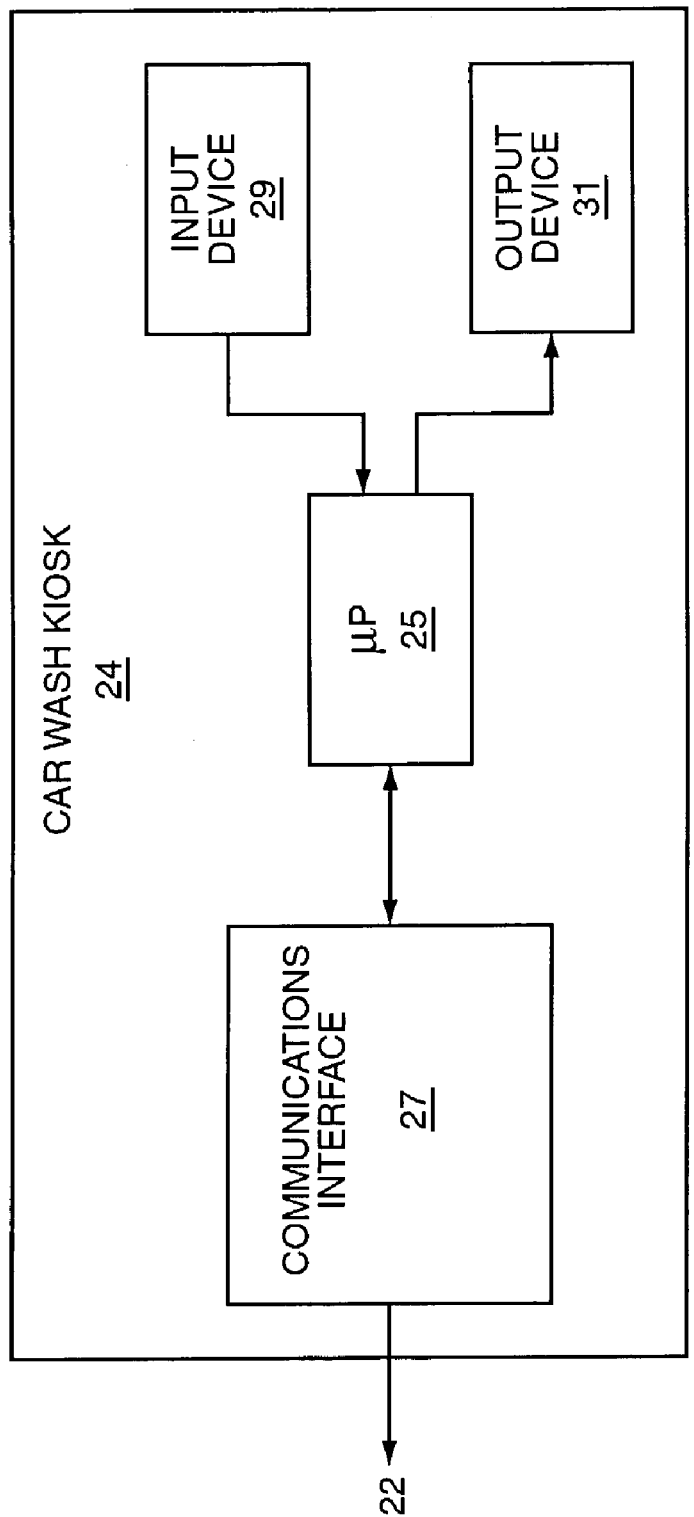
FIG. 3 is a schematic diagram of the internal components of the car wash kiosk.

FIG. 3 illustrates a block diagram of the internal components of the car wash kiosk 24. The car wash kiosk 24 contains a microprocessor 25 or other micro-controller that is used to make decisions to control the operation of the car wash kiosk 24. The microprocessor 25 is communicatively coupled to a communications interface 27. The communications interface 27 is coupled to the fuel dispenser communication loop 22 and provides the communications interface between the microprocessor 25 and the fuel dispenser communication loop 22. The microprocessor 25 is also coupled to one or more input devices 29 and one or more output devices 31. The input devices 29 provide information to the microprocessor 25 for various decisionmaking, such as payment information and an authentication code. The output device 31 is used by the microprocessor 25 to display or output different types of information to the customer, such as to a visual display, audio output, or a receipt printer for various purposes, as described below.

Figure 4:
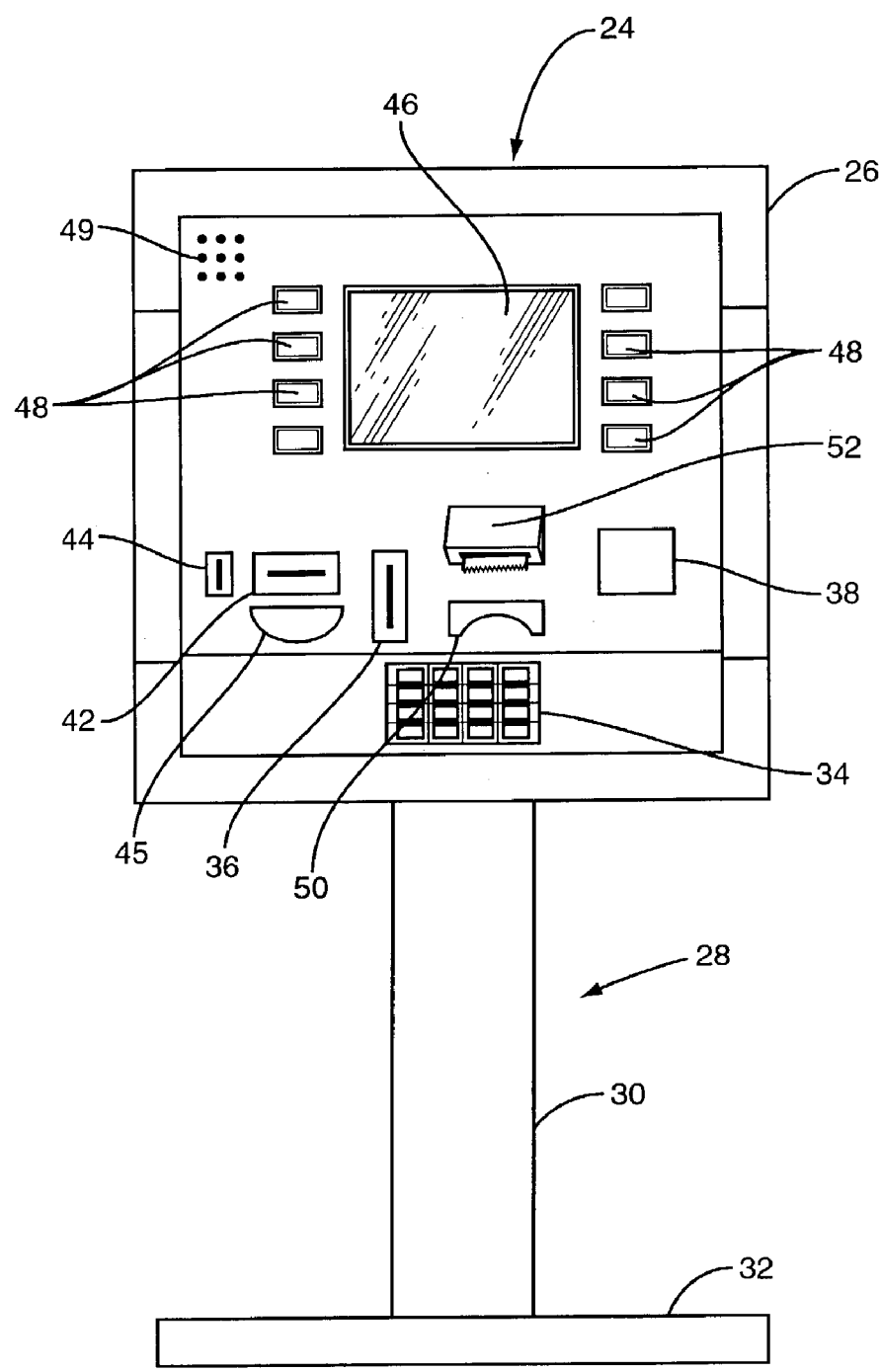
FIG. 4 is a schematic diagram of a car wash kiosk.

FIG. 4 illustrates a car wash kiosk 24 that may be used with the present invention. However, please note that a car wash kiosk 24 need only provide one method of payment entry for a customer to pay for a car wash in its minimalist form. The car wash kiosk is designated in FIG. 4 generally as 24. The car wash kiosk 24 comprises a housing 26 that is attached to a mounting post 28. The mounting post 28 is comprised of a shaft 30 and a base 32. The shaft 30 is coupled to the housing 26 and extends downward to connect to the base 32. The base 32 is typically placed or bolted directly into the physical ground or cement of the service station forecourt area proximate to the physical car wash 10. The housing 26 is typically constructed for outdoor environments and sealed so that rain water does not penetrate inside. The car wash kiosk 24 may comprise one or more input devices for payment of a car wash. The car wash kiosk 24 may contain a keypad 34. The keypad 34 may be used for selection of different types of car washes available to the customer or to enter an authentication code. The keypad 34 may also be used for entry of a PIN number if the customer is using a debit card for payment of a car wash.

The car wash 24 may also contain an input device 29 known as a magnetic strip card reader 36 for insertion of credit, debit or other magnetic strip cards for payment. Additionally, the magnetic card strip reader 36 may accept loyalty or program-specific cards that entitle the customer to a fixed credit or percentage discount or other favorable pricing on a car wash. For instance, a customer desiring to pay for a car wash may first insert a loyalty card 30 into the card reader 36. The car wash kiosk 24 would identify the customer as a preferred customer and authorize a discount for car washes. The customer inserts some other form of payment into the car wash kiosk 24 to pay for the reduced price of the car wash before entering the physical car wash 10. The car wash kiosk 24 may also contain an input device known as a radio-frequency (RF) antenna 38. The RF antenna 38 is coupled to an RF interrogator (not shown). If the customer is tendering a RFID for payment of a car wash, the RF antenna 38 as controlled by the RF interrogator, will generate a field to interrogate the customer's RFID. The RFID and the RF antenna 38 will communicate using RF communications to identify the customer's account or other payment information. The RF interrogator 38 will communicate to the microprocessor 25 to indicate the payment information contained on the customer's RFID device. For more information on RFID payments and interaction at a fuel dispenser, see U.S. Pat. No. 6,073,840, previously referenced above, and incorporated herein by reference in its entirety.

The car wash kiosk 24 may also contain, as an input device 29, an optical scanner 40. The optical scanner 40 is capable of reading optically encoded data, such as a bar code. Again, this optically encoded data may be used for payment or identification of the customer for loyalty purposes. For example, the optical scanner 40 could be adapted to receive a optical data presented by a customer indicating that the customer is to receive a fixed or percentage discount towards the current car wash purchase. The optical data may be issued by the receipt printer 52 or by a receipt printer associated with the POS 16 or fuel dispenser 20. However, a fuel purchases is not necessarily required for a discount to be issued by the car wash kiosk 24. The car wash kiosk 24 may issue a discount for a car wash purchased based on the number of purchases previously made by a customer or based on a particular car wash option or type selected. Further, the discount issued by the car wash kiosk 24 may be based on the customer returning back to the same car wash kiosk 24 to purchase another car wash in a certain defined time period to encourage the customer to come back. For more information on optical scanners that may be used with fuel dispenser and used with the present invention to obtain a customer's account number for payment or identification for loyalty, see U.S. Pat. No. 6,112,981, entitled "Bar code reader for a fuel dispenser," incorporated herein by reference in its entirety.

The car wash kiosk 24 may also contain a bill acceptor 42 and a coin acceptor 44 as input devices for payment of a car wash using cash. The bill acceptor 42 accepts paper currency, and the coin acceptor 44 accepts coin for payment. A change delivery device 45 may also be used to deliver change for overpayment to a customer. The overpayment could also be applied as a credit towards other purchasing at the service station, such as a vacuum machine (not shown), fuel at a fuel dispenser 20, or items inside a store at the service station. If the overpayment is to be used at other locations, the car wash kiosk 24 and/or site controller 24 must be able to issue the overpayment credit through an output device 31 at the car wash kiosk 24 or communicate with such other locations to store the credit in memory and associate such credit with the customer through an identification means, such as by use of an authentication code.

The car wash kiosk 24 may also contain numerous types of output devices 31. For instance, a display 46 may be provided on the car wash kiosk 24. The display 46 may comprise a text or graphic output display, that may be of any technology or type known in the art, illustratively including any of a variety of liquid crystal displays (LCD), both Passive Matrix (PMLCD) and Active Matrix (AMLCD)—including Thin-Film Transistor (TFT-LCD), Diode Matrix, Metal-Insulator Metal (MIM), Active-Addressed LCD, Plasma-Addressed Liquid Crystal (PALC), or Ferroelectric Liquid Crystal Display (FLCD). Alternatively, the display may comprise Plasma Display Panel (PDP), Electroluminescent Display (EL), Field Emission Display (FED), Vacuum Fluorescent Displays (VFD), Digital Micromirror Devices (DMD), Light Emitting Diodes (LED), Electrochromic Display, Light Emitting Polymers, video display (cathode ray tube or projection), holographic projection, etc. The display technologies discussed above are illustrative in nature, and not intended to be limiting.

The display 46 may display different types of car washes available to the customer, advertising, merchandising messages, instructional text, and other information such as payment information and balance due information. Such advertising, merchandising messages, and instruction text may be third party vendor information programmed at the POS 16 to be displayed at the car wash kiosk 24 via display 46. Soft keys 48 may also be included as input devices 29. The soft keys 48 in FIG. 4 are aligned along side of the display 46. The display 46 may display different types of instructional options or commands requiring a customer to choose between different types of options. The display 46 can align different decisions that can be made by a customer with soft keys 48, such that the customer can choose one of the soft keys 48 to indicate a particular choice. The POS 16 may be configured to allow the enabling or disabling of advertising and merchandising information from third party vendors at the car wash kiosk 24.

The car wash kiosk 24 may also contain a receipt printer 50 as an output device. The receipt printer 50 may give the customer a receipt for payment of a car wash, or the receipt printer 50 could give the customer a coupon or an authentication code that could be used for a reduced car wash price or to authorize a car wash. For instance, in order to encourage customers to come back to the car wash more frequently, the receipt printer 50 may give an authorization code for a reduced car wash, or print out a bar code to be scanned by the optical scanner, to indicate a reduced car wash, for instance, if the customer comes back to receive a subsequent car wash within a certain amount of time. Also, a customer may purchase a car wash at the car wash kiosk 24 and get a receipt with an authentication code so that the customer may later return to receive the car wash. Also, the customer may use other forms of identification when coming back to claim the car wash, such as the customer's account information on a credit or debit card, RFID, or optical card.

The car wash kiosk 24 may also contain an input and output device known intercom 49 for delivery of audio information to a customer and for the customer to interact with a human operator for any number of reasons, including instructions, questions, etc. The intercom 49 may be composed of a speaker (not shown) for output of an audio message and a microphone (not shown) for input of an audio message. The intercom 49 audio traffic is communicated over the fuel dispenser communication loop 22 to the POS 16.

Figure 5A:
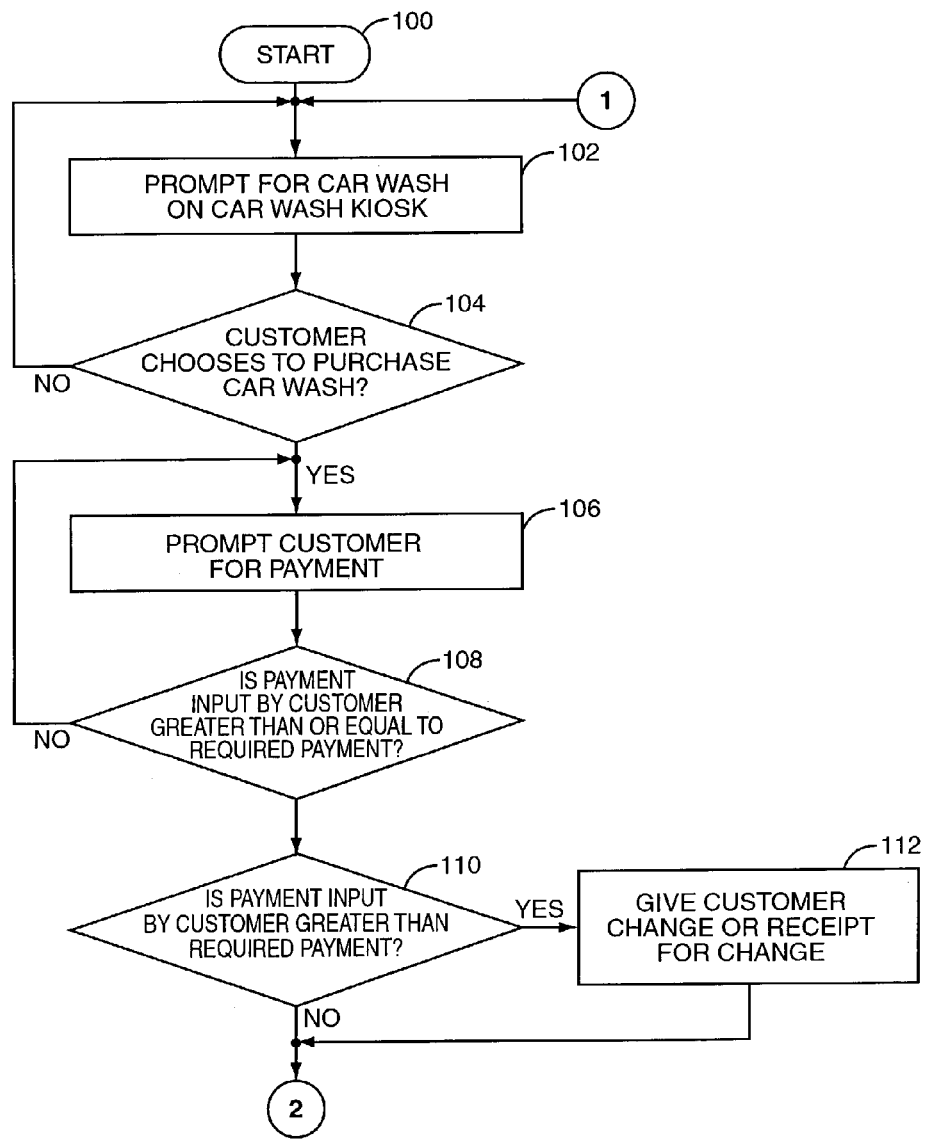
FIG. 5A is a flowchart diagram of the operation of the car wash system according to the present invention.
Figure 5B:
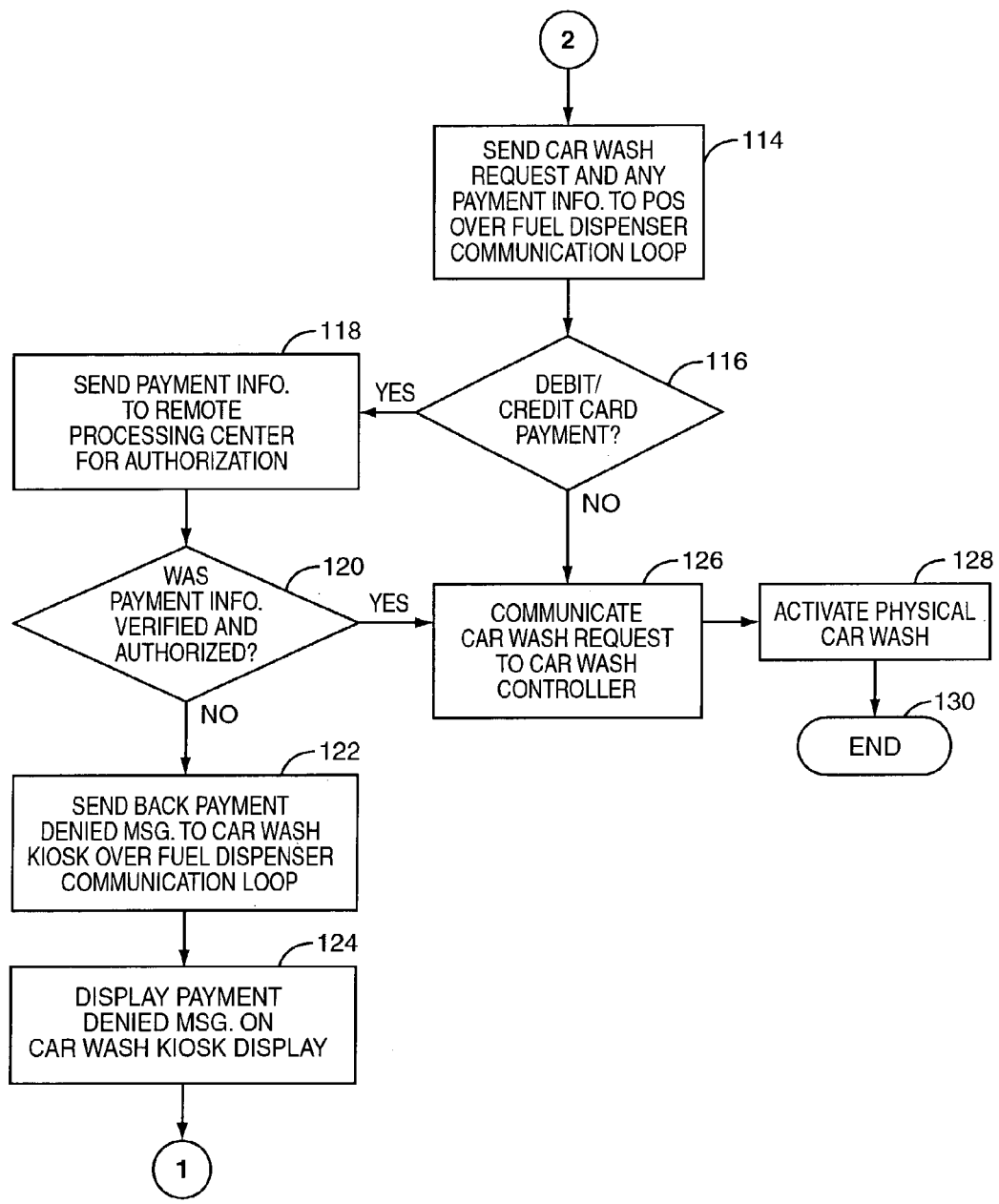
FIG. 5B is a continuation of the flowchart diagram illustrated in FIG. 5A.

FIG. 5 illustrates a more detailed description, in the form of a flow chart diagram, of the car wash operation for the present invention. The process starts (block 100), and the customer is prompted for a car wash on the car wash kiosk 24 (block 102). The car wash kiosk 24 determines if the customer has chosen to purchase a car wash (decision 104). If the customer has not chosen to purchase a car wash, the process continues to prompt the customer for a car wash (block 102). If the customer has chosen to purchase a car wash, the car wash kiosk 24 prompts the customer for payment (block 106). If the payment input by the customer into the car wash kiosk 24, via an input device 29, is not greater than or equal to the payment required (decision 108), the car wash kiosk 24 continues to prompt the customer for additional payment required to purchase a car wash. This may be necessary since the customer may be inserting currency or coin for payment, in which multiple deposits of currency or coin are required before the total amount of payment entered into the car wash kiosk 24 equals or is greater than the purchase price of the car wash.

The different of types of payment that may be used at the car wash kiosk 24 is dependent upon the car wash kiosk 24 being physically configured to provide such different payment types. For example, in order for the car wash kiosk 24 to accept credit or debit cards, cash, and transponders for payment, the car wash kiosk 24 must be configured to have the magnetic strip card reader 36, the bill acceptor 42 and/or coin acceptor 44, and the RF interrogator 38. The POS 16 may contain configuration capabilities to enable and disable different types of payment types accepted by the car wash kiosk 24, and may be configured to require the customer to pay an attendant rather than being able to automatically pay using an input device 29 for payment.

If the payment input by the customer into the car wash kiosk 24 is greater than or equal to the required payment (decision 108), the car wash kiosk 24 determines if the payment input by the customer is greater than the required payment (decision 110). If yes, the car wash kiosk 24 gives the customer change through the change delivery device 45, if possible, or via a receipt that can be later redeemed in the convenience store or elsewhere for change at the POS 16 (block 112). Alternatively, the change receipt may contain a code that can be later used as credit towards the next car wash purchase.

If the payment input by the customer is equal to the required payment (decision 110), the car wash kiosk 24 sends a car wash request and any payment information to the POS 16 over the fuel dispenser communication loop 22 (block 114). The POS 16 determines if the payment information communicated to it by the car wash kiosk 24 is a debit or credit payment transaction (decision 116). If yes, the POS 16 sends the customer's payment information to the remote processing center 25 for credit card or debit card authorization (block 118). Note that credit or debit card information can come from any type of input device 29, including but not limited to the magnetic strip card reader 36, the RF antenna 38, or the optical scanner 40. The POS 16 then determines if the payment information has been verified and authorized (decision 120). If yes, the car wash request is communicated from the POS 16 to the car wash controller 12 (block 126). The car wash controller 12 then activates the physical car wash 10 (block 128) for the customer to receive the car wash, and the process ends (block 130).

If the payment information for a credit or debit card transaction was not verified and authorized by the POS 16, as communicated by the remote processing center 25 to the POS 16 (decision 120), the POS 16 sends back a payment denied message to the car wash kiosk 24 over the fuel dispenser communication loop 22 (block 122). The car wash kiosk 24 displays the payment denied message on its display 46 so that the customer knows that his credit card or debit card payment information has not been authorized (block 124). The process then returns back to the beginning where a customer is prompted for a car wash on the car wash kiosk 24 (block 102). This step is performed so that a customer may re-initiate a new interaction with the car wash kiosk 24 to pay for a car wash. The customer may choose to use a different credit card or other payment means to pay for a car wash.

As previously described above, in decision 116, where the car wash kiosk 24 determined if the payment entered in by the customer was a debit or credit card payment, if the answer to this inquiry was no, the customer's payment was performed by some other means that did not require authorization. Therefore, the process would communicate the car wash request to the car wash controller 12 (block 126), and the car wash controller 12 would activate the physical car wash 10 to deliver the car wash to the customer (block 128). The process would then end (block 130). As an option, before the physical car wash 10 is activated, the car wash kiosk 24 may notify the customer to lower his car antenna or provide other instructions needed or required to enter the physical car wash 10.

It should be noted that while a debit or credit card payment was shown as requiring authorization at the remote processing center 25, other types of payment, including payment by an RFID device received by the RF antenna 38 interrogator, may also require authorization such that communication is required between the POS 16 and a remote processing center 25. The advantage of the car wash kiosk 24 being coupled to the fuel dispenser communication loop 22 is that all of the processing and control that is implemented in the POS 16 can be taken advantage of as if the car wash kiosk 24 was the same type of device as a fuel dispenser 20 to the POS 16.

Figure 6A:
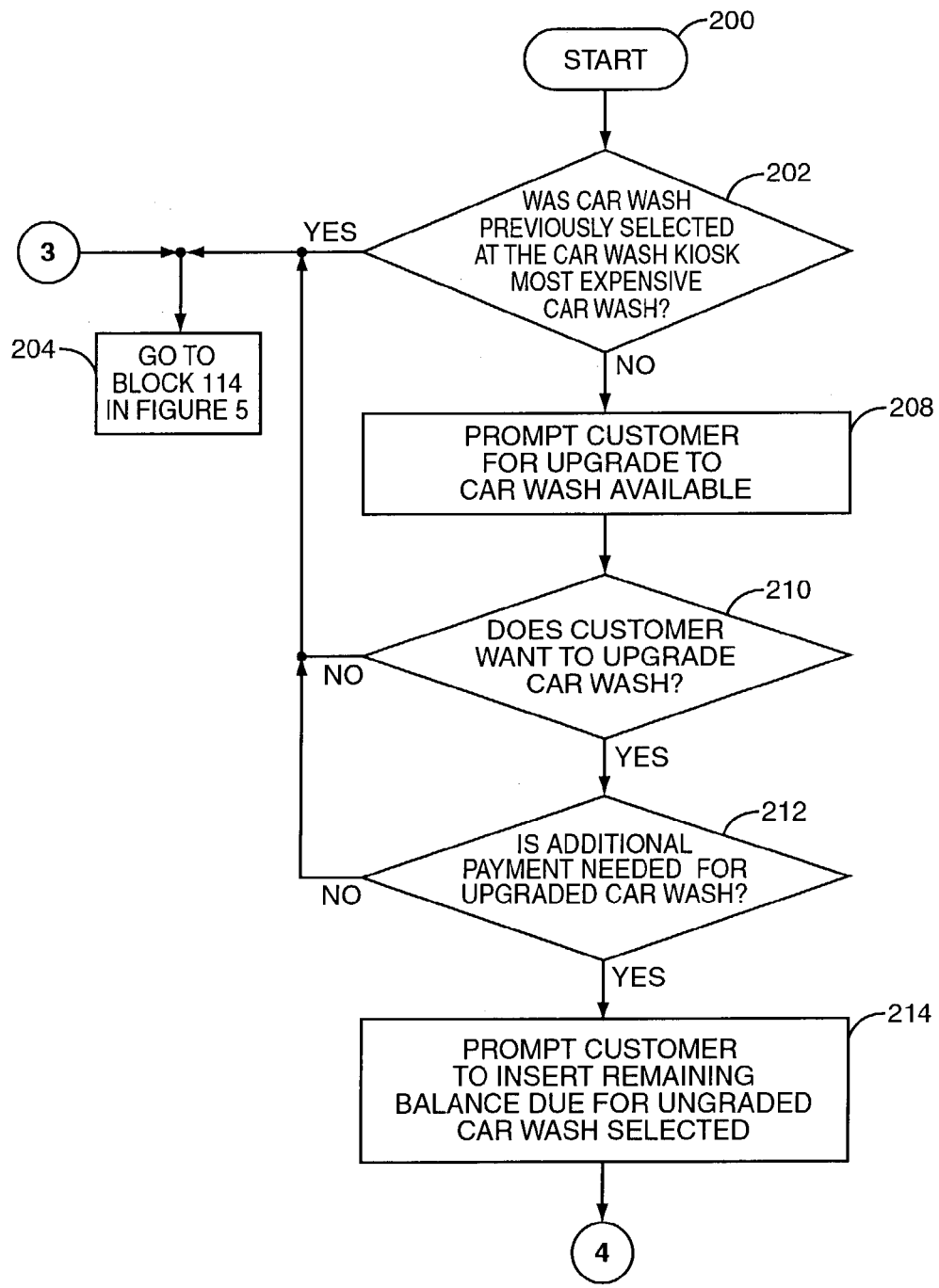
FIG. 6A is a flowchart diagram of the operation of the car wash kiosk handling additional payment for an upgraded car wash.
Figure 6B:
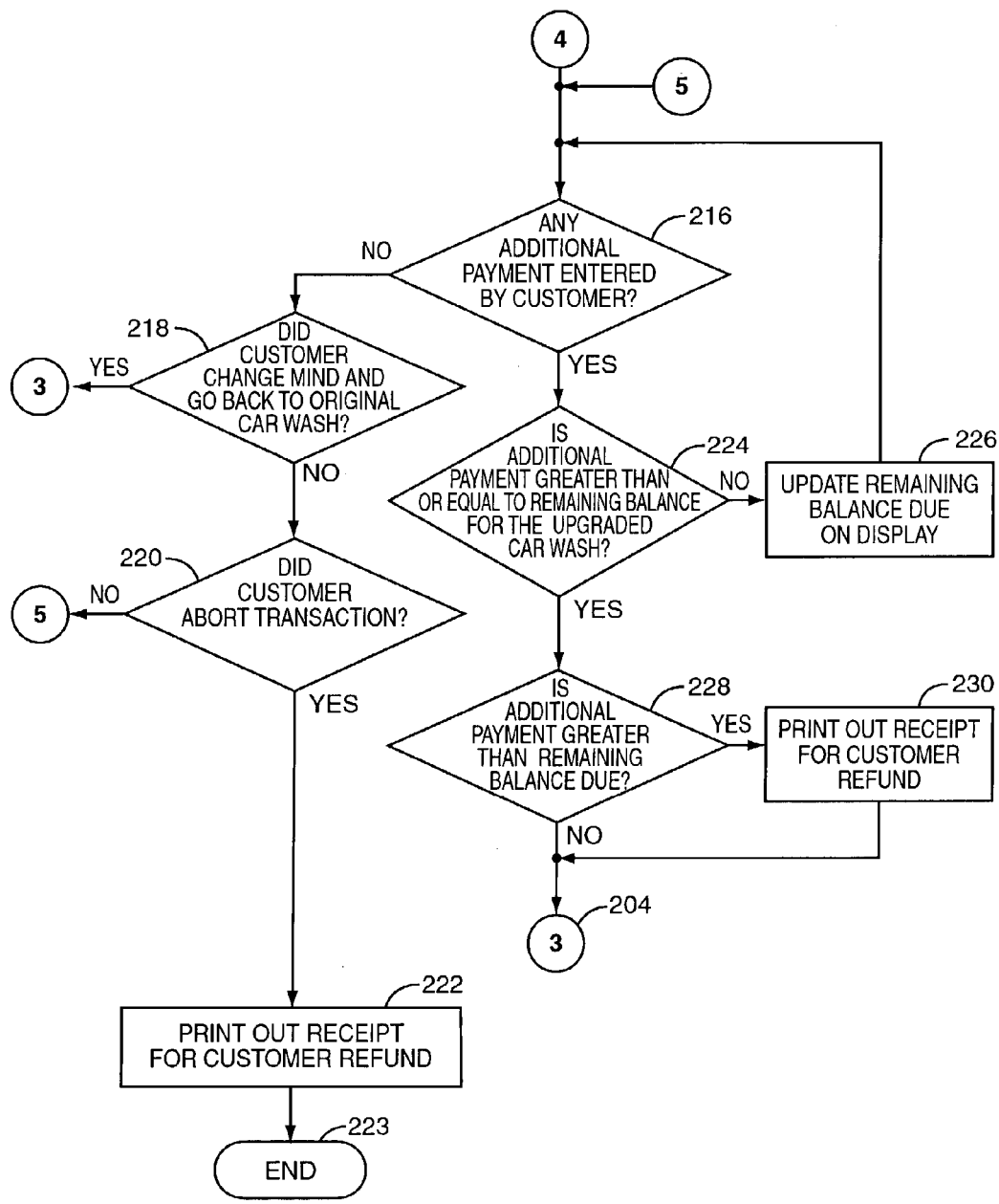
FIG. 6B is a continuation of the flowchart diagram illustrated in FIG. 6A.

FIG. 6 illustrates another aspect of the invention that allows the customer to upgrade a car wash selected. The car wash kiosk 24 may prompt the customer for an upgrade after an initial car wash has been selected, or the car wash kiosk 24 may prompt the customer for a car wash previously purchased at the fuel dispenser 20 or POS 16 in which the customer has a receipt, authentication code or other identifying means to indicate that an initial car wash has already been purchased.

If the customer is purchasing a car wash at the car wash kiosk 24, the customer is continuously informed if there is any remaining balance due between an originally selected car wash and an upgraded car wash until payment entered equals the payment price for the upgraded car wash. This processing could be inserted in the flowchart illustrated in FIG. 5 between blocks 106 and 112, if desired. The process starts (block 200), and the car wash kiosk 24 determines if the car wash previously selected by the customer is the most expensive car wash available (decision 202). If so, the process goes to block 114 in FIG. 5 to activate and deliver the car wash to the customer (block 204) since no further upgrade is possible. If the car wash previously selected by the customer at the car wash kiosk 24 was not the most expensive car wash (decision 202), this means that an upgrade to the car wash selected is possible. The customer is prompted for the different possible upgrades available for the car wash on the car wash kiosk display 46 (block 208). If the customer does not wish to upgrade the car wash from the previously selected car wash (decision 210), the process goes to block 114 in FIG. 5 to activate the car wash (block 204).

It is important to also note that decision 202 can also determine if a previously purchased car wash was the most expensive car wash. The customer may have previously purchased the car wash at the fuel dispenser 20, POS 16, or other location. As previously discussed, the car wash kiosk 24 has the ability to determine, through an input device 29 and interaction with the car wash controller 12, whether or not the customer has previously purchased a car wash. If so, the car wash kiosk 24 will determine if an upgrade is possible based on the previously purchased car wash type and not on a current selection by the customer.

If the customer does wish to upgrade the previously selected car wash (decision 210), the car wash kiosk 24 determines if any additional payment is needed for the upgraded car wash (decision 212). If no, the process goes to block 114 in FIG. 5 to carry forward with activation of the car wash (block 204). If yes, the customer is prompted to insert the remaining balance due for the upgraded car wash selected (block 214). The car wash kiosk 24 then determines if any additional payment has been entered by the customer (decision 216). If not, the car wash kiosk 24 determines if the customer has changed his or her mind and desires to return to the original car wash selected (decision 218). If yes, the process goes to block 114 in FIG. 5 (block 204) to activate the car wash with the car wash originally selected by the customer. If not, the car wash kiosk 24 determines if the customer desires to abort the car wash transaction (decision 220). There may be a cancel button or other means of aborting the transaction on the car wash kiosk 24. If the customer desires to abort the transaction, a receipt or other method of giving a customer a refund for any previously entered payment is given to the customer (block 222) and the process ends (block 223).

If the customer did not desire to abort the car wash transaction (decision 220), the car wash kiosk 24 determines if any additional payment has been entered by the customer for payment of the upgraded car wash (decision 216), and the process continues. If the answer is yes, the car wash kiosk 24 determines if the additional payment entered by the customer is greater than or equal to the remaining balance due for the upgraded car wash (decision 224). If not, the car wash kiosk 24 updates the remaining balance due for the upgraded car wash on the display 46 (block 226) and the process returns to determine if any additional payment has been entered by the customer (decision 216) since there is still a remaining balance due for the upgraded car wash. If the additional payment entered by the customer for the upgraded car wash is greater than or equal to the remaining balance due (decision 224), the car wash kiosk 24 determines if the payment entered by the customer is greater than the remaining balance due (decision 228). If yes, a receipt or other means of giving the customer a refund is printed out and given to the customer (block 230). For instance, a receipt may be printed to the customer with the amount of refund that can be tendered to an operator at the POS 16 inside the convenience store for a refund. The process then goes to block 114 in FIG. 5 to activate the car wash for delivery to the customer (block 204). If the additional payment was not greater than the remaining balance due in decision 228, this means that the payment entered by the customer for the upgraded car wash and the amount due were equal. In this case, the process goes to block 114 in FIG. 5 (block 204) to activate the car wash for delivery of the car wash to the user.

The car wash kiosk 24 is also able to perform any of the aforesaid functionalities even while the physical car wash 10 is performing a car wash on a previous customer's car that is inside the physical car wash 10. The car wash controller 24 is capable of controlling the physical car wash 10 and interact with the POS 16 to handle requests and communications from the POS 16, fuel dispensers 20 and the car wash kiosk 24 for customers ordering car washes and performing other functionalities at the car wash kiosk 24.

The Appendix to this specification also contains screens that are displayed on the display 46 to show the flow of the process of the car-wash kiosk 24 and the POS 16 that may be implemented by the car wash kiosk 24 in one embodiment of the invention. Each of the drawings in the Appendix are annotated for screens that are displayed on the display 46 of the car wash kiosk 46 and flow processing and the decision making that the car wash kiosk 46 and the system described above in the present invention makes during operation. One of ordinary skill in the art can easily ascertain the screen selection and flow processing from the drawings in the appendix. These screens and flow processing are one embodiment of the present invention, and the present invention is not limited to this embodiment.

The screens that may be displayed on the display of the car wash kiosk 24 during its idle state (step 102 in FIG. 5A) are shown in the page entitled "Idle Screens" on page 1 of the Appendix.

The flow of the car wash kiosk 24 that may be implemented for entering an authentication code for obtaining a car wash is displayed on page 2 of the Appendix entitled "Wash Code Redemption Enabled." The POS 16 must be configured to allow the car wash kiosk 24 to accept an authentication code as payment for a car wash for these screens to be applicable.

The payment processing performed by the car wash kiosk 24 that may be implemented for using a transponder, credit/debit card, and currency is shown on page 3 of the Appendix entitled "Payment Processing."

The upgrade processing performed by the car wash kiosk 24 that may be implemented for transponder and credit/debit card is displayed on page 4 of the Appendix entitled "Upgrade Payment Processing."

The upgrade processing that may be performed by the car wash kiosk 24 for when the customer is using the bill acceptor 42 for payment is displayed on page 5 of the Appendix entitled "Cash Acceptor Upgrade Payment Processing."

The cash acceptor processing that may be performed by the car wash kiosk 24 for when the customer uses currency in the bill acceptor 42 for payment of a car wash is displayed on page 6 of the Appendix entitled "Cash Acceptor Processing."

The end of transaction processing that may be performed by the car wash kiosk 24 at the end of a transaction to pay for a car wash is displayed on page 7 of the Appendix entitled "End of Transaction Processing."

The end of car wash transaction processing that may be performed by the car wash kiosk 24 at the end of a car wash being performed by the physical car wash 10 is displayed on page 8 of the Appendix entitled "End of Car Wash Transaction Processing." The upgrade payment options that may be performed by the car wash kiosk 24 to give payment options to the customer for an upgraded car wash is displayed on page 9 of the Appendix entitled "Upgrade Payment Options."

Those skilled in the art will recognize improvements and modifications to the preferred embodiments of the present invention. All such improvements and modifications are considered within the scope of the concepts disclosed herein and the claims that follow.

What is claimed is:

1. A system for communicating a car wash request to a POS, comprising:
   at least one fuel dispenser communicatively coupled to said POS through a fuel dispenser communication loop, wherein the fuel dispenser communication loop carries communications relating to control of said at least one fuel dispenser to said POS in response thereto; and
   a car wash kiosk, separate from said at least one fuel dispenser and which does not dispense fuel, coupled to the fuel dispenser communication loop via a wired connection, comprising:
      an input device adapted to receive said car wash request; and
      a control system adapted to receive said car wash request from said input device;
      said control system adapted to receive configuration information from the POS and communicate said car wash request over said fuel dispenser communication loop to the POS to request authorization for a car wash.

2. The kiosk of claim 1, wherein said input device further comprises a payment input device.

3. The kiosk of claim 2, wherein said input device is selected from the group consisting of a bill acceptor, a magnetic strip card reader, a RF interrogator, an optical scanner, a touch-screen display, a keypad, and soft-keys.

4. The kiosk of claim 3, wherein said bill acceptor is selected from the group consisting of a coin acceptor and a currency acceptor.

5. The kiosk of claim 3, wherein said magnetic strip card reader is adapted to receive a PIN in response to receipt of a debit card in said magnetic strip card reader.

6. The kiosk of claim 3, wherein said magnetic strip card reader is adapted to receive a debit card, a credit card, a proprietary card, a membership card, an oil company card, a discount card, and a prepaid card.

7. The kiosk of claim 1, wherein said car wash kiosk further comprises an output device for delivering information regarding the car wash.

8. The kiosk of claim 7, wherein said output device is a receipt printer that gives a paper receipt in response to a car wash request from said input device.

9. The kiosk of claim 8, wherein said paper receipt contains an authentication code.

10. The kiosk of claim 7, wherein said output device is a visual display.

11. The kiosk of claim 10, wherein said visual display is selected from the group consisting of a text display and a graphic display.

12. The kiosk of claim 11, wherein said visual display displays other merchandise for purchase in addition to a car wash.

13. The kiosk of claim 12, wherein said other merchandise is selected from the group consisting of food, drink, automotive goods, and tickets.

14. The kiosk of claim 10, wherein said visual display displays advertising.

15. The kiosk of claim 1, wherein said at least one fuel dispenser is also capable of communicating a fuel dispenser car wash request over said fuel dispenser communication loop to the POS to request an authentication code for controlling the car wash.

16. The kiosk of claim 15, wherein said input device is also adapted to receive said authentication code to authorize a car wash associated with said fuel dispenser car wash request.

17. The kiosk of claim 15, wherein said input device is configured to accept as an input said authentication code for authorization of a car wash.

18. A car wash system for controlling a car wash to be performed on a customer's vehicle, comprising:
   a car wash controller, comprising a car wash controller input device, said car wash controller adapted to generate an authentication code that can later be input into said car wash controller input device by the customer and verified by said car wash controller to activate the car wash;
   a POS communicatively coupled to said car wash controller;
   one or more fuel dispensers communicatively coupled to said POS through a fuel dispenser communication loop to dispense fuel under control of said POS; and
   a car wash kiosk, separate from the one or more fuel dispensers and which does not dispense fuel, coupled to the fuel dispenser communication loop via a wired connection, comprising:
      an input device to input a car wash request; and
      a control system coupled to said input device;
      said control system adapted to communicate said car wash request over said fuel dispenser communication loop to said car wash controller through said POS to authorize said car wash.

19. The system of claim 18, wherein said car wash controller generates said authentication code in response to receiving said car wash request.

20. The system of claim 19, wherein said car wash controller communicates said authentication code to said control system via said POS and over said fuel dispenser communication loop.

21. The system of claim 20, wherein said car wash kiosk further comprises an output device wherein said authentication code is output to the customer through said output device.

22. The system of claim 21, wherein said output device is selected from the group consisting of a receipt printer, a visual display, and a RF interrogator.

23. The system of claim 22, wherein said receipt printer generates a paper receipt in response to a car wash request from said input device.

24. The system of claim 18, wherein said car wash kiosk further comprises a payment input device for payment of the car wash.

25. The system of claim 24, wherein said payment input device receives a customer's account number in response to said car wash request.

26. The system of claim 25, said payment input device communicates said account number to said control system wherein said control system farther communicates said account number to said POS over said fuel dispenser communication loop.

27. The system of claim 26, wherein said POS communicates said account number to a remote processing center for authorization.

28. The system of claim 27, wherein said remote processing center communicates a verification message to said POS if said account number is verified.

29. The system of claim 28, wherein said POS communicates said car wash request to said car wash controller after said account number is verified.

30. The system of claim 29, wherein said car wash controller generates said authentication code in response to receiving said car wash request.

31. The system of claim 30, wherein said car wash controller communicates said authentication code to said control system via said POS and over said fuel dispenser communication loop.

32. The system of claim 31, wherein said car wash kiosk further comprises an output device wherein said authentication code is output to the customer through said output device.

33. The system of claim 32, wherein said output device is selected from the group consisting of a receipt printer, a visual display, and a RF interrogator.

34. The system of claim 33, wherein said receipt printer generates a paper receipt in response to said car wash request from said input device.

35. The system of claim 24, wherein said payment input device is configured to accept as an input said authentication code for authorization of the car wash.

36. The system of claim 35, wherein said output device is a visual display and wherein said control system causes said visual display to display a validation message once said authentication code is verified.

37. The system of claim 36, wherein said output device notifies the customer to lower the antenna on the vehicle before entering the car wash.

38. The system of claim 24, wherein said payment input device accepts said car wash request when the car wash is operating on a previous customer's vehicle.

39. The system of claim 18, wherein said car wash kiosk further comprises an output device for delivering information regarding the car wash.

40. The system of claim 18, wherein said at least one fuel dispenser is also capable of communicating a fuel dispenser car wash request over said fuel dispenser communication loop to the POS to request an authentication code for controlling the car wash in response to the customer selecting a car wash on a fuel dispenser input device on said fuel dispenser.

41. The system of claim 40, wherein said fuel dispenser is adapted to receive said authentication code to authorize a car wash associated with said fuel dispenser car wash request.

42. The system of claim 41, wherein said fuel dispenser car wash request is comprised of a most expensive car wash and a less expensive car wash than said most expensive car wash.

43. The system of claim 42, further comprising an output device that is a visual display and wherein said visual display displays an upgrade car wash option for selection by said input device if said fuel dispenser car wash request response is not for said most expensive car wash.

44. The system of claim 43, wherein said control system calculates and displays on said output device the balance due for said upgrade car wash option based on the difference between the normal price for said upgrade car wash option and the car wash option associated with said fuel dispenser car wash request.

45. The system of claim 44, wherein said car wash kiosk further comprises a payment input device that accepts payment for said upgrade car wash option if there is a balance due for said upgrade car wash.

46. The system of claim 18, wherein said input device is further adapted to input a merchandise request for merchandise ordered by the customer.

47. The system of claim 46, wherein said merchandise request is communicated over said fuel dispenser communication loop to a merchandise fulfillment system.

48. The system of claim 46, wherein said car wash kiosk further comprises a payment input device that receives payment from the customer for said merchandise request.

49. The system of claim 46, wherein said merchandise is selected from the group consisting of food, beverage, motor oil, tickets and clothing.

50. The system of claim 18, wherein said car wash kiosk further comprises an output device that communicates validation of said authentication code.

51. The system of claim 18, further comprising a second car wash kiosk, comprising:
an input device to input a car wash request; and
a control system coupled to said input device;
said control system adapted to communicate said car wash request over said fuel dispenser communication loop to said car wash controller through said POS to authorize a car wash.

52. The system of claim 51, wherein said input device is configured to allow the customer to choose between a plurality of car washes for communication of said car wash request.

53. A method of communicating a car wash request for providing a car wash, comprising the steps of:
communicating configuration information to a car wash kiosk over a fuel dispenser communication loop, wherein the fuel dispenser communication loon is coupled to an at least one fuel dispenser;
inputting said car wash request on said car wash kiosk, wherein said car wash kiosk is coupled to said fuel dispenser communication loop via a wired connection, separate from said at least one fuel dispenser, and incapable of dispensing fuel;
communicating said car wash request over said fuel dispenser communication loop to a POS;
communicating said car wash request from said POS to a car wash controller; and
authorizing said car wash in response to said car wash request.

54. The method of claim 53, further comprising entering payment at said car wash kiosk to pay for the car wash.

55. The method of claim 54, wherein said car wash request is communicated to said POS only after payment has been entered at said car wash kiosk.

56. The method of claim 54, wherein said entering payment is selected from a step from the group of steps consisting of swiping a card in a card reader, scanning a card in an optical scanner, responding to an interrogation signal transmitted by said car wash kiosk, and entering cash into a bill acceptor.

57. The method of claim 53, further comprising displaying instructions to the customer about operation of the car wash.

58. The method of claim 57, wherein said instructions are selected from the group consisting of lower vehicle antenna, location of car wash entrance, and customer return message.

59. The method of claim 53, further comprising displaying advertising to the customer.

60. A system for communicating a car wash request to a POS, comprising:

at least one fuel dispenser communicatively coupled to said POS through a fuel dispenser communication loop, wherein the fuel dispenser communication loop carries communications relating to control of said at least one fuel dispenser to said POS in response thereto; and a car wash kiosk, separate from said at least one fuel dispenser and which does not dispense fuel, comprising:
- an input device adapted to receive said car wash request;
- a payment input device; and
- a control system adapted to receive said car wash request from said input device;
- said control system adapted to:
  - receive configuration information from said POS;
  - communicate said car wash request over said fuel dispenser communication loop to said POS to request authorization for a car wash; and
  - calculate an overpayment credit if payment entered into said payment input device is greater than cost of said car wash request.

61. The kiosk of claim 60, farther comprising a change delivery device that delivers change related to said overpayment credit.

62. The kiosk of claim 61, wherein said overpayment credit is delivered in the form selected from the group consisting of a printed refund receipt and a stored credit communicated by said control system to said POS for use at other locations within a fueling environment.

63. A system for communicating a car wash request to a POS, comprising:

at least one fuel dispenser communicatively coupled to said POS through a fuel dispenser communication loop, wherein the fuel dispenser communication loop carries communications relating to control of said at least one fuel dispenser to said POS in response thereto; and a car wash kiosk, separate from said at least one fuel dispenser and which does not dispense fuel, comprising:
- an input device adapted to receive said car wash request, wherein said car wash request is an authentication code from a previously purchased car wash option;
- said previously purchased car wash option is selected from the group consisting of a most expensive car wash, and a less expensive car wash than said most expensive car wash; and
- an output device tat is a visual display, wherein said visual display displays an upgrade car wash option for selection at said input device if said authorization code of said previously purchased car wash option is not for said most expensive car wash; and
- a control system adapted to receive said car wash request from said input device;
- said control system adapted to receive configuration information from said POS and communicate said car wash request over said fuel dispenser communication loop to said POS to request authorization for a car wash.

64. The kiosk of claim 63, wherein said control system calculates and displays a balance due for said upgrade car wash option based on the difference in price between said upgrade car wash option and said previously purchased car wash option.

65. The kiosk of claim 64, wherein said car wash kiosk further comprises a payment input device, wherein said payment input device accepts payment for said upgrade car wash option if there is a balance due for said upgrade car wash option.

66. A system for communicating a car wash request to a POS comprising:

at least one fuel dispenser communicatively coupled to said POS through a fuel dispenser communication loop, wherein to fuel dispenser communication loop carries communications relating to control of said at least one fuel dispenser to said POS in response thereto; and a car wash kiosk, separate from said at least one fuel dispenser and which does not dispense fuel, comprising:
- an input device adapted to receive a car wash request;
- an output device that is a visual display; and
- a control system adapted to receive said car wash request from said input device;
- said control system adapted to:
  - receive configuration information from said POS;
  - communicate said car wash request over said fuel dispenser communication loop to said POS to request authorization for a car wash; and
  - display a validation message on said visual display if an authentication code is entered into said input device for said car wash request and said authentication code is verified.

67. A car wash system for controlling a car wash to be performed on a customer's vehicle, comprising:

a car wash controller, comprising a car wash controller input device, said car wash controller adapted to generate an authentication code tat can later be input into said car wash controller input device by said customer and verified by said car wash controller to activate said car wash;

a POS communicatively coupled to said car wash controller;

one or more fuel dispensers communicatively coupled to said POS through a fuel dispenser communication loop to dispense fuel under control of said POS; and a car wash kiosk separate from the one or more fuel dispensers and which does not dispense fuel, comprising:
- an input device to input a car wash request;
- a payment input device to receive payments for said car wash request; and
- a control system coupled to said input device;
- said control system adapted to:
  - communicate said car wash request over said fuel dispenser communication loop to said car wash controller through said POS to authorize a car wash; and
  - calculate an overpayment credit if payment entered into said payment input device is greater than the cost of said car wash request.

68. The system of claim 67, further comprising an output device that is a change delivery device that delivers change if said overpayment credit is calculated.

69. The car wash system of claim 67, wherein said overpayment credit is delivered in the form selected from the group consisting of a refund receipt and a stored credit communicated by said control system to said POS for use at other locations within a fueling environment.

70. A method of communicating a car wash request for providing a car wash, comprising the steps of:
communicating configuration information to a car wash kiosk over a fuel dispenser communication loop, wherein the fuel dispenser communication loop is coupled to at least one fuel dispenser;

inputting said car wash request on said car wash kiosk, wherein said car wash kiosk is separate from said at least one fuel dispenser and incapable of dispensing fuel;

entering payment for said car wash request into an input payment device at said car wash kiosk;

calculating overpayment credit if payment entered into said input payment device is greater than the cost of said car wash request;

communicating said car wash request over said fuel dispenser communication loop to a POS;

communicating said car wash request from said POS to a car wash controller; and authorizing a car wash in response to said car wash request.

71. The method of claim 70, further comprising delivering overpayment credit in the form selected from the group consisting of a refund receipt and communicating a stored credit by said control system to said POS for use at other locations within a fueling environment.

72. A method of communicating a car wash request for providing a car wash, comprising the steps of:

communicating configuration information to a car wash kiosk over a fuel dispenser communication loop, wherein the fuel dispenser communication loop is coupled to at least one fuel dispenser;

inputting said car wash request on said car wash kiosk, wherein said car wash kiosk is separate from said at least one fuel dispenser and incapable of dispensing fuel;

offering an upgrade car wash option from said car wash request input by the customer at the car wash kiosk;

communicating said car wash request over said fuel dispenser communication loop to a POS;

communicating said car wash request from said POS to a car wash controller; and authorizing a car wash in response to said car wash request.

73. The method of claim 72, further comprising displaying a difference in price between said car wash request input and the upgrade car wash option if the customer selects said upgrade car wash option.

74. The method of claim 73, further comprising accepting additional payment for said difference in price.

* * * * *

UNITED STATES PATENT AND TRADEMARK OFFICE
CERTIFICATE OF CORRECTION

PATENT NO. : 7,201,315 B1 Page 1 of 1
APPLICATION NO. : 10/430689
DATED : April 10, 2007
INVENTOR(S) : Michael J. Symonds and Francis C. Williams It is certified that error appears in the above-identified patent and that said Letters Patent is hereby corrected as shown below:

Column 16
Line 62, change "farther" to -- further --.

Column 18
Line 34, change "loon" to -- loop --.

Column 19
Line 22, change "farther" to -- further --.
Line 49, change "tat" to -- that --.

Column 20
Line 5, change "POS comprising" to -- POS, comprising --.
Line 8, change "wherein to fuel" to -- wherein the fuel --.
Line 31, change "tat" to -- that --.

Signed and Sealed this

Eleventh Day of September, 2007

JON W. DUDAS
*Director of the United States Patent and Trademark Office*